UNITED STATES PATENT OFFICE.

ELMER ELLSWORTH BLACKMAN, OF LINCOLN, NEBRASKA.

COMPOSITION OF MATTER.

972,801.

No Drawing.

Specification of Letters Patent. Patented Oct. 18, 1910.

Application filed July 24, 1909. Serial No. 509,399.

*To all whom it may concern:*

Be it known that I, ELMER ELLSWORTH BLACKMAN, a citizen of the United States, residing at Lincoln in the county of Lancaster and State of Nebraska, have invented a new and useful composition of matter to be used in making porous materials—such as wood, paper, brick, leather, artificial stone, plaster casts, &c.—non-porous and for the purpose of preventing rust or oxidation in metal substances; also, for the purpose of preventing porous substances from absorbing water.

My composition consists of the following ingredients combined in the approximate proportions stated:

| | |
|---|---|
| Naphtha | 70 per cent. |
| Paraffin or mineral wax | 20 per cent. |
| Paraffin or mineral oil | 5 per cent. |
| Powdered steatite | 5 per cent. |

The ingredients are to be mixed in the following manner: Melt the wax; add the oil, then the powdered steatite, and thoroughly agitate continually until cold. This forms a substance which will keep indefinitely and can be readily mixed with the naphtha as required.

Any porous article, if saturated with this solution and wiped dry on the outer surface, will, after the evaporation of the naphtha, be nonporous at a point below the surface.

I am aware that wax is used to coat substances on the outside and thus make them nonporous by means of this coating, but I am not aware that wax has been used with naphtha, powdered steatite and oil, substantially as specified, to make porous substances nonporous by entering the substance and forming the nonporous condition below the surface or within the article treated.

I claim as new and desire to secure by Letters Patent:

1. A composition of matter for making porous substances non-porous consisting of mineral wax, twenty per cent.; mineral oil, five per cent.; powdered steatite five per cent.; and naphtha, seventy per cent., mixed as described.

2. The method for compounding a composition of matter for making porous substances non-porous, consisting in first melting the mineral wax, adding the mineral oil, then the powdered steatite and thoroughly agitating the same until cold and last mixing the aforesaid with naphtha as required.

ELMER ELLSWORTH BLACKMAN.

Witnesses:
WILLIAM EVERETT HARMAN,
ADDISON E. SHELDON.